(12) United States Patent
Hopf et al.

(10) Patent No.: US 11,846,244 B2
(45) Date of Patent: Dec. 19, 2023

(54) METHOD AND APPARATUS FOR OPERATING A FUEL INJECTION VALVE WITH THE AID OF MACHINE LEARNING METHODS

(71) Applicant: Robert Bosch GmbH, Stuttgart (DE)

(72) Inventors: Andreas Hopf, Stuttgart (DE); Erik Tonner, Mehring (DE); Frank Kowol, Knittlingen (DE); Jens-Holger Barth, Fellbach (DE); Konrad Groh, Stuttgart (DE); Matthias Woehrle, Bietigheim-Bissingen (DE); Mona Meister, Renningen (DE); Roland Norden, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/001,784

(22) PCT Filed: Sep. 10, 2021

(86) PCT No.: PCT/EP2021/074934
§ 371 (c)(1),
(2) Date: Dec. 14, 2022

(87) PCT Pub. No.: WO2022/053613
PCT Pub. Date: Mar. 17, 2022

(65) Prior Publication Data
US 2023/0228226 A1    Jul. 20, 2023

(30) Foreign Application Priority Data
Sep. 11, 2020    (DE) .................... 10 2020 211 416.1

(51) Int. Cl.
*F02D 41/14*    (2006.01)
*F02D 41/24*    (2006.01)

(52) U.S. Cl.
CPC ..... *F02D 41/1405* (2013.01); *F02D 41/2425* (2013.01); *F02D 2041/1433* (2013.01);
(Continued)

(58) Field of Classification Search
CPC ............. F02D 41/1405; F02D 41/2425; F02D 2041/1433; F02D 2200/0602; F02D 2200/0618
See application file for complete search history.

(56) References Cited

U.S. PATENT DOCUMENTS

| | | | | |
|---|---|---|---|---|
| 6,088,647 A | * | 7/2000 | Hemberger | ........... F02D 41/401 701/104 |
| 6,725,837 B2 | * | 4/2004 | Hiraku | ................ F02D 41/3836 123/456 |

(Continued)

FOREIGN PATENT DOCUMENTS

| | | |
|---|---|---|
| CN | 114013284 A * | 2/2022 |
| DE | 19740608 C2 | 2/2003 |

(Continued)

OTHER PUBLICATIONS

Graba et al., "Self-learning control algorithms used to manage the operating of an internal combustion engine," Journal of KONES Powertrain and Transport, vol. 26, No. 4, pp. 75-82. 2019. (Year: 2019).*

(Continued)

*Primary Examiner* — Phutthiwat Wongwian
*Assistant Examiner* — Mark L. Greene
(74) *Attorney, Agent, or Firm* — NORTON ROSE FULBRIGHT US LLP; Gerard Messina

(57) ABSTRACT

A method for operating an injection valve by ascertaining an opening time and/or closing time of the injection valve on the basis of a sensor signal. The method includes: providing an analysis point time series by sampling a sensor signal of a sensor of the injection valve; using a nonlinear, data-based first submodel in order to obtain a first model output on the basis of the analysis point time series; using a linear, data-based second submodel in order to obtain a second model output on the basis of the analysis point time series;

(Continued)

ascertaining the opening time and/or closing time as a function of the first and second model outputs.

9 Claims, 3 Drawing Sheets

(52) U.S. Cl.
CPC ............... *F02D 2200/0602* (2013.01); *F02D 2200/0618* (2013.01)

(56) References Cited

U.S. PATENT DOCUMENTS

| | | |
|---|---|---|
| 2013/0019842 A1 | 1/2013 | Shaver et al. |
| 2018/0179975 A1 | 6/2018 | Merlino et al. |

FOREIGN PATENT DOCUMENTS

| | | |
|---|---|---|
| DE | 10344181 A1 | 4/2005 |
| DE | 102007060049 A1 | 6/2009 |
| DE | 102012003581 B3 | 7/2013 |
| DE | 102018212669 A1 | 1/2020 |
| DE | 102019209690 A1 | 3/2020 |
| DE | 102019209644 A1 | 1/2021 |

OTHER PUBLICATIONS

International Search Report for PCT/EP2021/074934, dated Jan. 10, 2022.

\* cited by examiner

METHOD AND APPARATUS FOR OPERATING A FUEL INJECTION VALVE WITH THE AID OF MACHINE LEARNING METHODS

FIELD

The present invention relates to a method for operating a fuel injection valve of an internal combustion engine using data-based models, in particular for determining an opening time and/or closing time to estimate a quantity of fuel injected.

BACKGROUND INFORMATION

For metering fuel in combustion engines, electromechanical or piezoelectric injection valves are used. These allow a direct and precisely measured supply of fuel into the cylinders of the combustion engine.

One challenge consists in controlling the combustion process as precisely as possible in order to improve operating properties of the combustion engine, in particular with regard to fuel consumption, efficiency, pollutant emissions, and smoothness. For this purpose, it is essential to operate the injection valves in such a way that the quantity of fuel to be injected can be metered with high repeatability, under varying working pressures, and, where applicable, with a plurality of injections per working cycle.

Injection valves may include an electromagnetic actuator or a piezo actuator, which actuate a valve needle in order to lift it off from a needle seat and to open an orifice of the injection valve to discharge the fuel into the combustion chamber. Because of structural differences and different operating conditions, such as temperature, fuel pressure, or fuel viscosity, there is uncertainty in determining the exact opening time, i.e., the time from which fuel passes through the injection valve into the combustion chamber of the cylinder, and the exact closing time of the injection valve, i.e., the time up to which fuel passes through the injection valve into the combustion chamber of the cylinder.

SUMMARY

According to the present invention, a method for operating a fuel injection valve, and an apparatus and an injection system are provided.

Example embodiments and further configurations of the present invention are disclosed herein.

According to a first aspect of the present invention, a method is provided for operating an injection valve by ascertaining an opening time and/or closing time of the injection valve on the basis of a sensor signal. According to an example embodiment of the present invention, the method includes:
  providing an analysis point time series by sampling a sensor signal of a sensor of the injection valve;
  using a nonlinear, data-based first submodel in order to obtain a first model output on the basis of the analysis point time series;
  using a linear, data-based second submodel in order to obtain a second model output on the basis of the analysis point time series;
  ascertaining the opening time and/or closing time as a function of the first and second model outputs, and as a function of a weighting factor for weighting the first and/or second model outputs.

Although an injection valve is controlled according to a defined profile of a control signal, the opening and closing movements of the injection valve caused thereby vary, so the actual opening time and closing time for starting and ending the fuel injection cannot be precisely defined. The reason for this lies in the complex dependencies of the valve movement on the current operating point.

In order to monitor the valve movement, a piezo sensor is provided in the injection valves, which takes the form of a pressure sensor in order to sense the pressure changes in a fuel pressure triggered by the control of the injection valve and to provide a corresponding sensor signal. The measured sensor signal may then be analyzed to ascertain the actual opening time and closing time of the injection valve in order to adjust the control of the injection valve correspondingly in this way.

However, the sensor signal is also noisy, and depends in particular on the actual fuel pressure in the fuel supply and the duration of the control to be measured.

According to an example embodiment of the present invention, the analysis of the sensor signal to ascertain an opening time and/or closing time of the injection valve may be performed with the aid of a data-based analysis model. The data-based analysis model may correspond to or comprise a probabilistic regression model, a neural network, or a classification model.

The use of data-based analysis models to ascertain an opening time or closing time is advantageous, since suitable modeling with the aid of a physically motivated model in particular is not feasible owing to the many different influences and interactions. In safety-critical applications, however, the use of purely data-based models is questionable, since it is not possible to ensure for each operating point that the output of the analysis model does not lead to undesirable system behavior.

In accordance with the above method, therefore, the analysis model may be provided as a hybrid model which ascertains the opening time or closing time independently on the basis of two data-based submodels and combines the results of the submodels in order to obtain the opening time and closing time. For this purpose, a first data-based submodel is provided, which maps an analysis point time series derived from a sensor signal of a piezo sensor in the injection valve to a model output, which indicates an opening time and/or closing time.

The first data-based submodel may take the form of a nonlinear neural network. The nonlinear neural network generally includes a plurality of layers having neurons, at least one of which includes a nonlinear activation function. The starting layer is preferably provided without a nonlinear activation function. This allows even complex nonlinear relationships to be modeled.

The second data-based submodel may take the form of a linear neural network having preferably only one layer. The linear second submodel does not include a nonlinear activation function, and thus differs from the nonlinear first submodel by lower complexity.

In the linear neural network, the input vector is multiplied by a matrix and the result is provided as a model output. No activation functions, in particular nonlinear ones, are provided. Using the linear submodel makes it possible for the influence of the individual entries in the analysis point time series to be explicitly understood. No unexpected model outputs are able to occur here. This is important in particular for safety-critical applications, in which the exclusive use of so-called black-box models, in which the calculation processes are not comprehensible, is not permissible.

The results of the two submodels are combined in order to obtain the actual opening time and/or closing time. In this way, it is possible to achieve a trade-off between the reliability of the second submodel and the accuracy of the first submodel.

According to one specific embodiment of the present invention, the first and second submodels may be created so that they each output an output vector, each element of the output vectors being assigned to a determined opening time and/or closing time, the submodels being configured so that they indicate the value of each element of the output vector according to a probability with which a time determined by an index value of the element corresponds to the opening time and/or closing time to be output. In particular, the opening time and/or closing time may be ascertained by ascertaining the index value of the element of the output vector having the correspondingly highest value and assigning the index value to a corresponding opening time and/or closing time.

The submodels may thus be configured to output a log it, which corresponds in each case to an output vector. The output vector comprises a number of elements, the index values of which indicate determined times for the opening time and closing time. Consecutive index values correspond to consecutive opening times and/or closing times with time intervals that may be identical or variable.

The relevant opening time and/or closing time is ascertained by correspondingly adding together the elements of the output vectors in an index-wise weighted manner using a defined weighting factor in order to obtain a total output vector, the index value of the element of the total output vector having the correspondingly highest value being ascertained and the ascertained index value being assigned to a corresponding opening time and/or closing time.

Alternatively, the first and second submodels may be created so that they each output an opening time or closing time directly. In this way, at least the first data-based submodel may also be provided with one or more regression models in order to output the actual time, i.e., the opening time or closing time, corresponding to the training of the submodels.

The second data-based submodel may be provided as a linear model, which assigns the analysis point time series to an opening time and/or closing time indication in the same way. The submodels are preferably configured so that the formats of the output of the opening time and/or closing time are identical.

The time actually to be ascertained corresponds in both cases to an average of the weighted results of the submodels.

The submodels may be trained correspondingly using defined analysis point time series having corresponding labels. In the case of regression models, the labels may correspond to the corresponding opening time and/or closing time. In the case of a classification model, the labels may correspond to an output vector having a number of elements, with the index values of the elements each being assigned to a determined corresponding opening time and/or closing time. For example, the output vector of the label may allocate a "0" to all the elements, and allocate a "1" only to that element of which the index value is to be assigned to the determined opening time and/or closing time.

After the training, during inference of the corresponding submodel, the value of the relevant element indicates a probability with which the assigned time corresponds to an opening or closing time.

The first submodel may correspond to a neural network, a support vector model, a Gaussian process model, or the like.

The linear function of the second submodel corresponds to a data-based linear model which analyzes the analysis point time series with the aid of a matrix multiplication, the calculations in the linear model being comprehensible in contrast to the calculations in the first submodel owing to the linearity of a matrix multiplication. This is important in particular for safety-critical applications, since the use of so-called black-box models, in which the calculation processes are not transparent, is not permissible.

According to a further aspect of the present invention, a method is provided for the training of submodels for a data-based analysis model for determining an opening time and/or closing time of an injection valve. According to an example embodiment of the present invention, the method includes the following steps:
  providing training data sets, which in each case indicate a determined opening time or closing time for an analysis point time series;
  training a first submodel, which takes the form of a nonlinear, data-based model, with the aid of the training data sets;
  training a second submodel, which takes the form of a linear, data-based model, with the aid of the training data sets.

It may be provided that a weighting factor is determined for combining the model outputs by determining for defined training data sets how reliably the second submodel determines the opening time and/or closing time, the weighting factor $\lambda$, which adds together the model outputs of the first and second submodels in a weighted manner, being established such that a change to the model output of the second submodel as a result of the model output of the first submodel does not adversely affect a correct determination of the opening time and/or closing time.

According to a further aspect, an apparatus for carrying out the above method is provided.

BRIEF DESCRIPTION OF THE DRAWINGS

Specific embodiments will be explained in greater detail below with reference to the figures.

DETAILED DESCRIPTION OF EXAMPLE EMBODIMENTS

Figure 1:
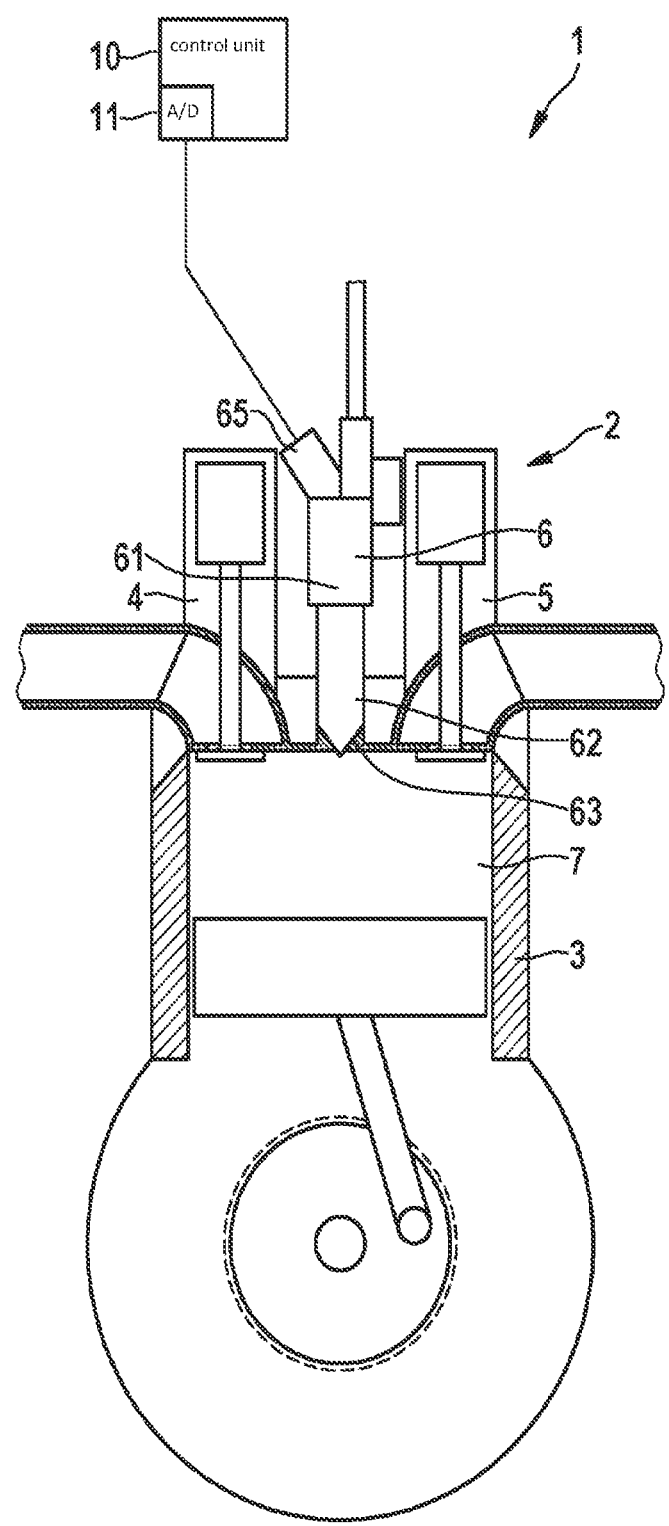
FIG. 1 is a schematic diagram of an injection system for injecting fuel into the cylinder of a combustion engine, according to an example embodiment of the present invention.

FIG. 1 shows an arrangement of an injection system 1 for a combustion engine 2 of a motor vehicle, for which a cylinder 3 (in particular one of a plurality of cylinders) is shown by way of example. Combustion engine 2 preferably takes the form of a direct injection diesel engine, but may also be provided as a spark ignition engine.

Cylinder 3 includes an inlet valve 4 and a discharge valve 5 for supplying fresh air and discharging combustion exhaust gas.

Furthermore, fuel for operating combustion engine 2 is injected into a combustion chamber 7 of cylinder 3 by way of an injection valve 6. For this purpose, fuel is supplied to the injection valve by way of a fuel feed line 8, by way of which fuel is provided under high fuel pressure in a conventional manner (e.g., common rail).

Injection valve 6 includes an electromagnetically or piezoelectrically controllable actuator unit 61, which is coupled to a valve needle 62. In the closed state of injection valve 6, valve needle 62 is seated on a needle seat 63. By controlling actuator unit 61, valve needle 62 is moved in a longitudinal direction and uncovers part of a valve opening in needle seat 63 in order to inject the pressurized fuel into combustion chamber 7 of cylinder 3.

Injection valve 6 further includes a piezo sensor 65, which is arranged in injection valve 6. Piezo sensor 65 is deformed by pressure changes in the fuel being passed through injection valve 6, and generates a voltage signal as a sensor signal.

The injection takes place under the control of a control unit 10, which defines a quantity of fuel to be injected by energizing actuator unit 61. The sensor signal is sampled over time with the aid of an A/D converter 11 in control unit 10, in particular at a sampling rate of 0.5 to 5 MHz.

The sensor signal serves to ascertain a correct opening time and/or closing time of injection valve 6 during operation of combustion engine 2. For this purpose, the sensor signal is digitized into a sensor signal time series with the aid of A/D converter 11 and analyzed by a suitable analysis model, from which an opening period of injection valve 6, and correspondingly a quantity of fuel injected, is able to be ascertained as a function of the fuel pressure and further operating variables. To determine the opening period, in particular an opening time and a closing time are required in order to ascertain the opening period as the time difference between these variables.

An opening time or closing time may be ascertained by considering the sensor signal profile. In particular, the opening time and/or closing time may be ascertained with the aid of a data-based analysis model.

Figure 2:
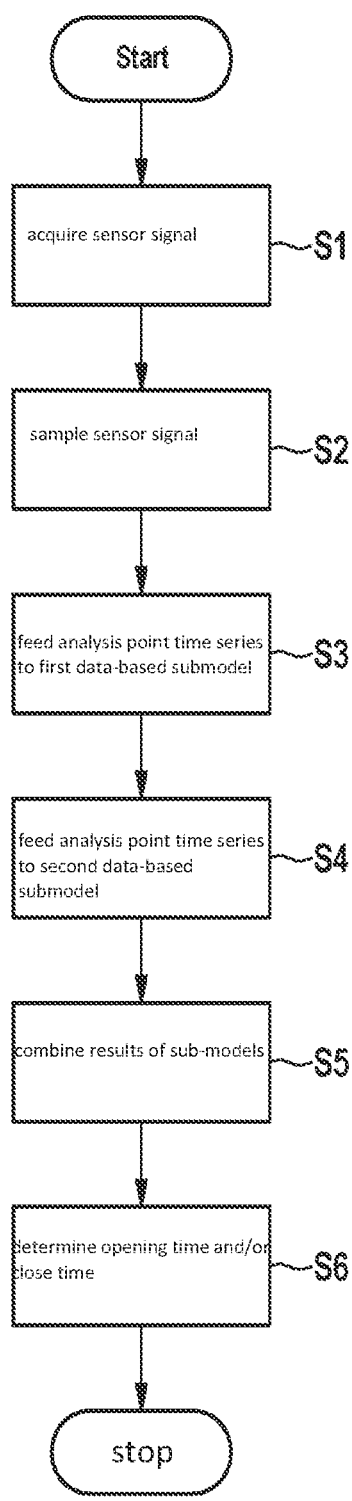
FIG. 2 is a flow diagram representing a method for applying a trained data-based analysis model to determine a quantity of fuel injected, according to an example embodiment of the present invention.

FIG. 2 illustrates a method for ascertaining an opening time and/or closing time of an injection valve 6 of a cylinder 3 in an engine system 1 with the aid of a flow diagram. The method is used to perform control functions for combustion engine 2, and in particular for this purpose to ascertain the quantity of fuel injected.

Figure 3:
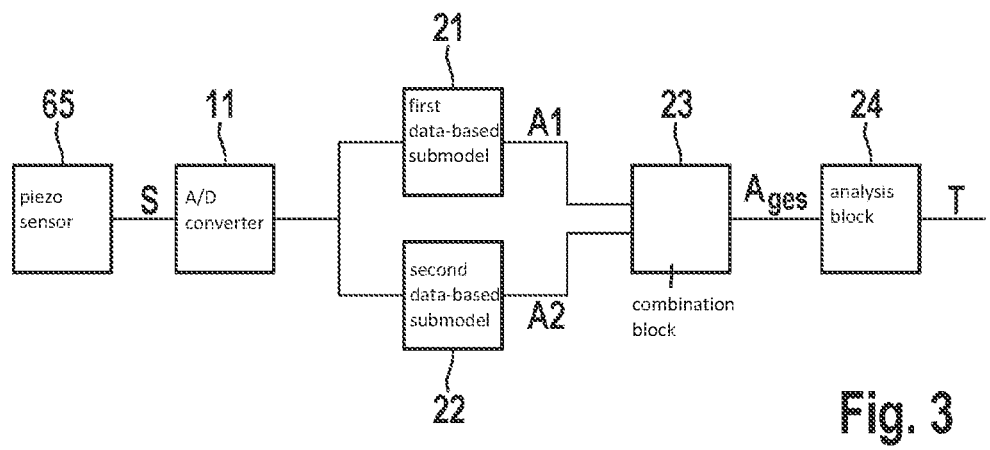
FIG. 3 is a block diagram illustrating a method for ascertaining an opening time and/or closing time of an injection valve with the aid of a data-based analysis model, according to an example embodiment of the present invention.

The method will be described in greater detail in conjunction with the block diagram of FIG. 3. The method is executed in control unit 10, in which it may be implemented in the form of software and/or hardware.

The method will be described with the aid of considering an injection valve 6 for a single cylinder 3 of combustion engine 2. The method may, of course, be applied in parallel to all the injection valves 6 of a combustion engine 2, i.e., including to multi-cylinder combustion engines.

In step S1, a sensor signal is acquired with the aid of piezo sensor 65. This signal is generally a voltage signal, which is generated on the basis of pressure changes in the supplied fuel.

In step S2, the sensor signal is sampled with the aid of A/D converter 11 in order to ascertain an analysis point time series within an analysis period. The analysis period may be established with reference to a control time window of the injection valve, which is defined by the start of the control of the actuator unit 61 and an established period, that of a maximum period in which the control signal for actuator unit 61 specifies a valve opening. The control time window thus has a defined time reference for which an analysis point time series is provided, representing the basis for the further ascertaining of an opening time and/or closing time. In particular, the analysis point time series may be ascertained by downsampling the previously oversampled sensor signal.

Figure 4:
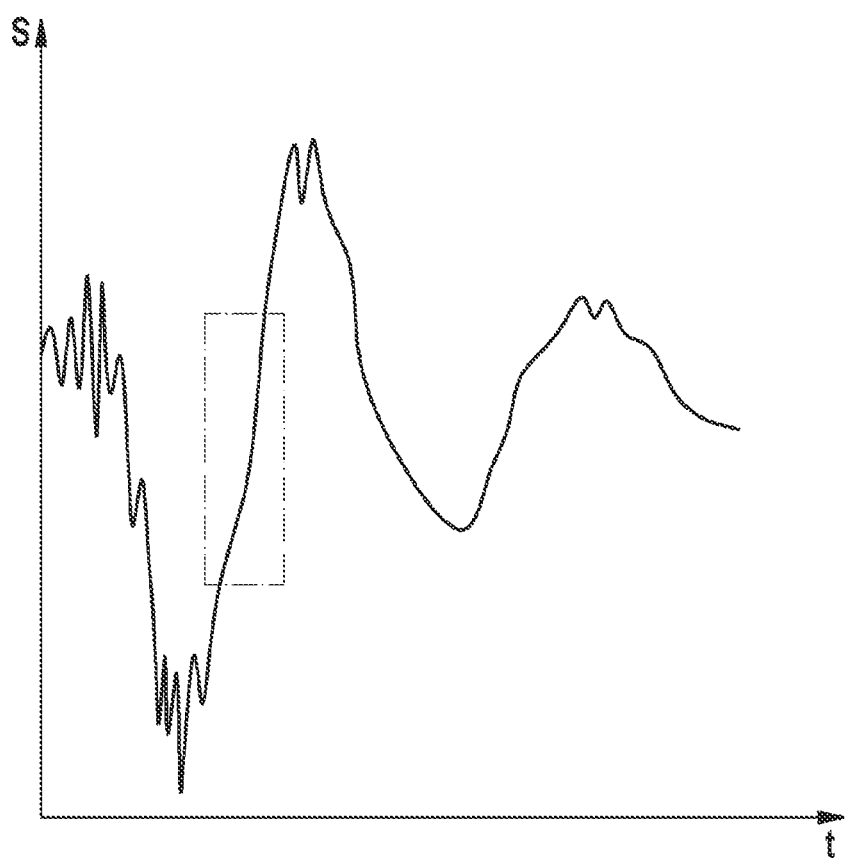
FIG. 4 is a schematic diagram of an exemplary time profile of an analysis point time series, according to an example embodiment of the present invention.

The analysis period may be provided with a fixed time reference to the combustion cycles of combustion engine 2; in particular, the analysis period may start at a pre-determined crankshaft position, preferably within the compression cycle. The analysis period may be selected such that the entire opening time window of the injection valve may be portrayed therein. Such an analysis period with an exemplary analysis point time series is shown in FIG. 4.

In step S3, the analysis point time series is fed to a first data-based submodel 21. The first data-based submodel 21 may be a trained neural network having a plurality of layers, and or the like. At least one layer includes one or more neurons containing an activation function, in particular a nonlinear activation function. The output layer, which provides the model output, is preferably provided without an activation function.

The first submodel 21 provides a log it as a first output vector A1 (first model output). The first output vector A1 comprises a number of elements, each of which is assigned to a possible opening time and/or closing time. Preferably, the possible opening times or closing times are assigned to the index values of the elements according to their time sequence, so that the time sequence corresponds to the sequence of increasing index values.

In a step S4, the analysis point time series is fed to the second submodel 22. As a linear, data-based model, second submodel 22 may have been trained on the training data. Second data-based submodel 22 may take the form of a linear neural network, preferably having only one layer. In the linear neural network, the input vector is multiplied by a matrix, and the result is provided as the model output—in this case a second output vector A2. No activation functions, in particular nonlinear activation functions, are provided. The use of the linear submodel means that the influence of the individual entries in the analysis point time series is able to be explicitly understood.

Second submodel 22 may thus be used even in safety-critical areas, since it is comprehensible and unexpected model outputs can be ruled out.

The result of the analysis of the analysis point time series in second submodel 22 corresponds to the same format as in first submodel 21, namely second output vector A2, from which a second opening time and/or closing time is ascertainable in the manner described above.

The training of first submodel 21 and of second submodel 22 takes place with the aid of training data sets, each containing an analysis point time series and an associated output vector. The output vector codes the opening time and/or closing time to be trained, which has been previously determined by measuring the injection valve on a test rig, so that a high value, in particular a "1", is only allocated to that element of which the index value corresponds to the opening time and/or closing time to be trained, while a low value, in particular a "0", is allocated to the other elements.

In step S5, the results of submodels 21, 22, namely the first and second output vectors, are combined together element-wise in a combination block 23. For this purpose, the output vectors of submodels 21, 22 are first normalized, e.g., by scaling the elements of the relevant output vector A1, A2 such that their sum is "1". The elements having the same index value are then added together in a weighted manner using a defined weighting factor λ according to $$A_{tot} = \lambda A1 + (1-\lambda)A2$$

A total output vector $A_{tot}$ is obtained. By using a variable weighting factor λ, trust in the result of the first and second submodels 21, 22 may be taken into account.

The weighting factor λ may be parameterized with training data. In this case, the weighting factor λ is adjusted such that, for all previously ascertained training data sets, a correct model prediction of second submodel 22 does not change as a result of a model output of first data-based submodel 21.

Firstly here, with the aid of selected training data sets, in particular training data sets that were not provided for training second submodel 22, those training data sets for which linear second submodel 22 determines a correct opening time or closing time are ascertained.

The weighting factor λ is then able to be adjusted, e.g., by an iterative approach, such that, for all previously ascertained training data sets, the opening time or closing time specified by total output vector $A_{tot}$ matches the corresponding specified opening time or closing time of the relevant training data set.

The weighting factor is preferably fixed at a value, such as 0.5.

In step S6, in an analysis block 24, the opening time and/or closing time to be ascertained is determined by ascertaining the index value of the element of the total output vector $A_{tot}$ having the maximum value using an arg max function, and assigning the index value to a corresponding time as the opening time and/or closing time. The assignment corresponds to a time pattern defined for the output vector.

In an alternative specific embodiment, submodels 21, 22 may directly output a first and/or second opening time and/or closing time, which are directly combined using the weighting factor A in order to obtain an overall opening time and/or closing time for the further operation of the injection valve.

What is claimed is:

1. A method for operating an injection valve by ascertaining an opening time and/or closing time of the injection valve based on a sensor signal, the method comprising the following steps:
   providing an analysis point time series by sampling a sensor signal of a sensor of the injection valve;
   using a nonlinear, data-based first submodel to obtain a first model output based on the analysis point time series;
   using a linear, data-based second submodel to obtain a second model output based on the analysis point time series;
   ascertaining the opening time and/or closing time as a function of the first model output and the second model output;
   wherein the first submodel and the second submodel are configured so that they output an output vector as the first model output and the second model output, respectively, each element of the output vectors being assigned to a determined opening or closing time, the first and second submodels being configured so that they each indicate a value of each element of the output vector according to a probability with which a time determined by an index value of the element corresponds to the opening time or closing time to be output.

2. The method as recited in claim 1, wherein the opening time and/or closing time is ascertained by correspondingly adding together the elements of the output vectors in an index-wise weighted manner using a defined weighting factor to obtain a total output vector, an index value of an element of the total output vector having a correspondingly highest value being ascertained and the ascertained index value being assigned to a corresponding opening time and/or closing time.

3. The method as recited in claim 1, wherein the operation of the injection valve is carried out as a function of the opening time and/or closing time, the operation of the injection valve being performed in such a way that an opening period of the injection valve, which is determined by the ascertained opening time and/or closing time, is set to a defined setpoint opening period.

4. A method for operating an injection valve by ascertaining an opening time and/or closing time of the injection valve based on a sensor signal, the method comprising the following steps:
   providing an analysis point time series by sampling a sensor signal of a sensor of the injection valve;
   using a nonlinear, data-based first submodel to obtain a first model output based on the analysis point time series;
   using a linear, data-based second submodel to obtain a second model output based on the analysis point time series;
   ascertaining the opening time and/or closing time as a function of the first model output and the second model output;
   wherein the first submodel is in the form of a nonlinear neural network and the second submodel is in the form of a linear neural network.

5. A method for operating an injection valve by ascertaining an opening time and/or closing time of the injection valve based on a sensor signal, the method comprising the following steps:
   providing an analysis point time series by sampling a sensor signal of a sensor of the injection valve;
   using a nonlinear, data-based first submodel to obtain a first model output based on the analysis point time series;
   using a linear, data-based second submodel to obtain a second model output based on the analysis point time series;
   ascertaining the opening time and/or closing time as a function of the first model output and the second model output;
   wherein the first and second submodels are configured so that they each output a time by regression, and the times are added together in a weighted manner as a function of a weighting factor to determine the opening time or closing time.

6. A method for training submodels for a data-based analysis model for determining an opening time and/or closing time of an injection valve, comprising the following steps:
   providing training data sets, which indicate a determined opening time and/or closing time for an analysis point time series;
   training a first submodel, which takes the form of a nonlinear, data-based model, using the training data sets;

training a second submodel, which takes the form of a linear, data-based model, using the training data sets.

7. The method as recited in claim 6, wherein a weighting factor is determined for a weighted combining of first and second model outputs of the first and second submodels, respectively, so that, for a quantity of defined training data sets, a correct model output of a time as an opening time or closing time by the second submodel does not change as a result of a model output of the first data-based submodel.

8. An apparatus configured to operate an injection valve by ascertaining an opening time and/or closing time of the injection valve based on a sensor signal, the apparatus configured to:
provide an analysis point time series by sampling a sensor signal of a sensor of the injection valve;
use a nonlinear, data-based first submodel to obtain a first model output based on the analysis point time series;
use a linear, data-based second submodel to obtain a second model output based on the analysis point time series;
ascertain the opening time and/or closing time as a function of the first model output and the second model output;
wherein the first submodel is in the form of a nonlinear neural network and the second submodel is in the form of a linear neural network.

9. A non-transitory machine-readable storage medium on which are stored commands for operating an injection valve by ascertaining an opening time and/or closing time of the injection valve based on a sensor signal, the commands, when executed by a computer, causing the computer to perform the following steps:
providing an analysis point time series by sampling a sensor signal of a sensor of the injection valve;
using a nonlinear, data-based first submodel to obtain a first model output based on the analysis point time series;
using a linear, data-based second submodel to obtain a second model output based on the analysis point time series;
ascertaining the opening time and/or closing time as a function of the first model output and the second model output;
wherein the first submodel is in the form of a nonlinear neural network and the second submodel is in the form of a linear neural network.

* * * * *